No. 777,360. Patented December 13, 1904.

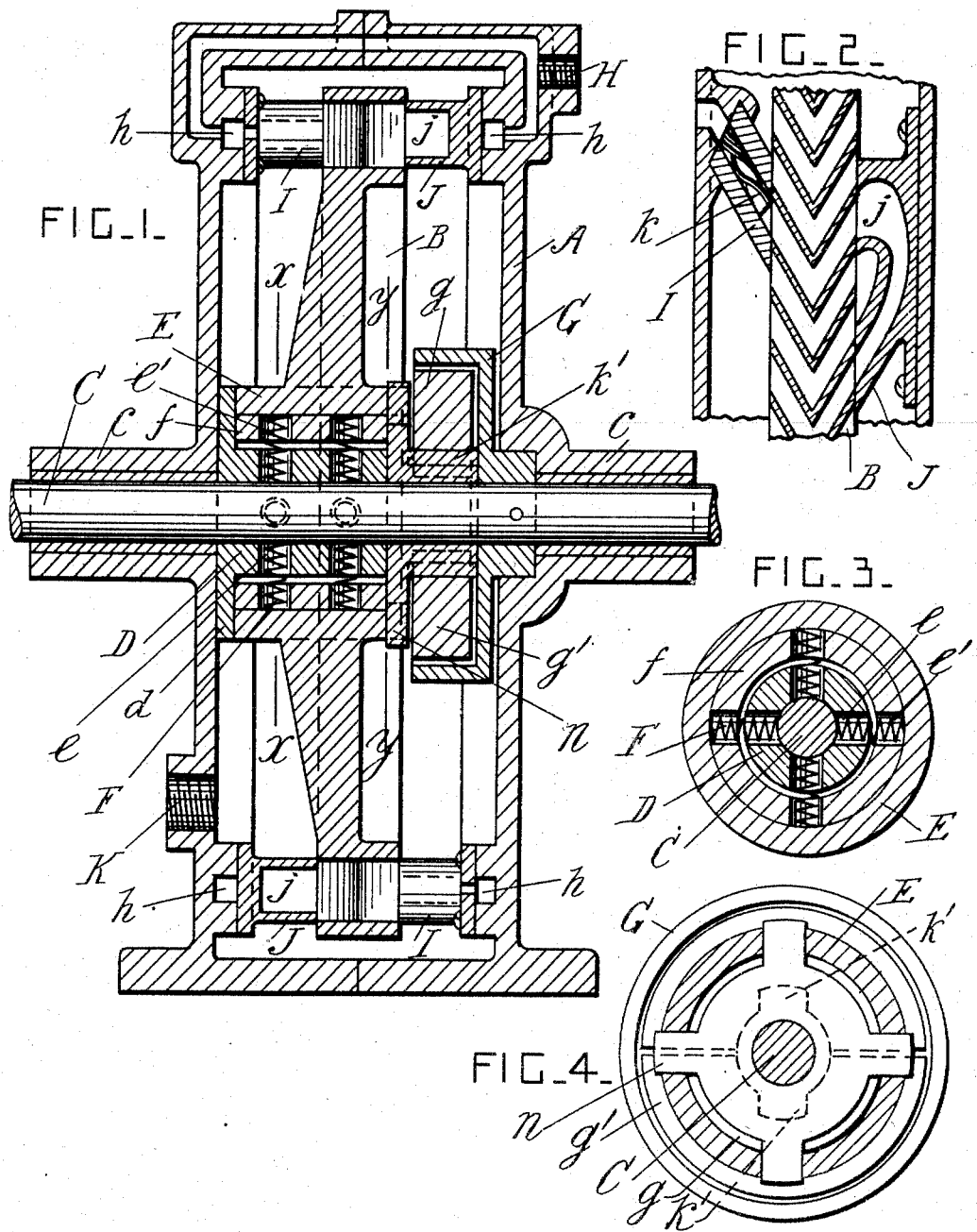

UNITED STATES PATENT OFFICE.

WILLIAM WYAND, OF COLLINGSWOOD, NEW JERSEY, ASSIGNOR TO WYAND-SOMERS-MOORE PATENT DEVELOPING COMPANY, OF COLLINGSWOOD, NEW JERSEY, A CORPORATION OF NEW JERSEY.

ROTARY ENGINE.

SPECIFICATION forming part of Letters Patent No. 777,360, dated December 13, 1904.

Application filed May 21, 1904. Serial No. 209,057. (No model.)

*To all whom it may concern:*

Be it known that I, WILLIAM WYAND, a citizen of the United States, residing at Collingswood, in the county of Camden and State of New Jersey, have invented certain new and useful Improvements in Rotary Engines; and I do hereby declare the following to be a full, clear, and exact description of the invention, such as will enable others skilled in the art to which it appertains to make and use the same.

This invention relates to rotary engines or turbine-engines; and it consists in the novel construction and combination of the parts hereinafter fully described and claimed.

In the drawings, Figure 1 is a vertical section through the engine. Fig. 2 is a detail plan view of one pair of steam-jet nozzles, showing them and a portion of the steam-wheel in section. Figs. 3 and 4 are cross-sections through the hub of the steam-wheel, taken on the lines $x\,x$ and $y\,y$ in Fig. 1, respectively.

A is the cylinder or casing of the steam-wheel B of the engine. The steam-wheel B is provided with a series of V-shaped chambers at its periphery, and it is mounted on a shaft C, which is journaled in bearings $c$ on the casing. In carrying out this invention the steam-wheel is not connected direct to the shaft C.

D is a bush which is journaled freely on the shaft C and provided with a flange $d$ at one end, which runs against one of the bearings. The steam-wheel is provided with a hub E, which is mounted very loosely on the said bush D, so that there is a space between the said hub and bush. The hub and the bush are provided with opposed pockets $e$ and $e'$, and F represents springs arranged in the said pockets and normally holding the said wheel concentric with its shaft. The hub of the wheel may be made with a liner $f$, if desired, for greater convenience in forming the pockets, and this liner with the pockets drilled in it is rigidly secured in the hub. The hub and the liner may, however, be formed integral with each other, if desired.

G is a driver secured on the shaft C inside the casing A. This driver is operatively connected with the hub of the steam-wheel in any approved manner, so that the driver may be revolved by the steam-wheel and so that the steam-wheel is free to move radially to a limited extent in every direction. Any approved clutch mechanism $g$ is provided for connecting the hub of the steam-wheel with the driver.

H is the steam-inlet passage in the casing, and $h$ represents two annular steam-chambers inside the casing which are connected with the said inlet-passage. These annular chambers are provided at suitable points with inclined steam-jet nozzles I, which project the steam into the steam-chambers of the wheel, and thereby cause the said wheel to revolve.

In order to use the steam with economy, return jet-nozzles J are secured inside the casing at suitable points. These return-nozzles have curved passages $j$, which receive the steam from the V-shaped chambers of the wheel on the opposite side from which it enters the said chambers from the nozzles I and project the steam thus received into the V-shaped chambers of the wheel at a point in advance in the direction of its motion. The steam finally passes out of the V-shaped chambers on the same side of the wheel as it originally entered and fills the free space inside the casing.

K is the exhaust or outlet passage through which the steam leaves the casing.

The steam-jet nozzles I are preferably provided with spiral guides $k$, which give the steam a whirling motion before it enters the steam-wheel. The spring-supported wheel adjusts its center of gravity automatically when it attains a high speed.

The clutch mechanism $g$ preferably has two slidable friction blocks or segments $g'$, which engage with the internal periphery of the driver G when thrown outward by centrifugal force. These blocks have slots which engage with projections $k'$ on a collar which is mounted loosely on the shaft C, and the said collar has lugs $n$, which engage with slots in the end of the hub of the steam-wheel and permit the steam-wheel to move radially in all directions on the shaft.

What I claim is—

1. In a rotary engine, the combination, with a driving-shaft, and a steam-wheel mounted loosely on the said shaft and also free to move radially thereon; of a driving-collar mounted loosely on the said shaft and revolved by the said steam-wheel, a slidable friction-clutch member revolved by the said driving-collar, and a driver secured to the said shaft and revolved by the said friction-clutch member when the same is revolved rapidly.

2. In a rotary engine, the combination, with a driving-shaft, and a steam-wheel mounted loosely on the said shaft and also free to move radially thereon; of a slidable friction-clutch member which is revolved by the said wheel, said wheel and clutch member being otherwise movable and slidable independent of each other, and a driver secured to the said shaft and revolved by the said friction-clutch member when the same is revolved rapidly.

3. In a rotary engine, the combination, with a driving-shaft, and a sleeve mounted on the said shaft and provided with pockets; of a steam-wheel provided with a hub also provided with pockets and free to move radially on the said sleeve, supporting-springs arranged in the said pockets, a driver secured on the said shaft, and clutch mechanism between the said driver and wheel-hub.

In testimony whereof I have affixed my signature in the presence of two witnesses.

WILLIAM WYAND.

Witnesses:
H. CARL DUFF,
JOHN W. MOORE.